US007380176B2

(12) United States Patent
Tseng

(10) Patent No.: US 7,380,176 B2
(45) Date of Patent: May 27, 2008

(54) METHOD FOR TESTING DISPLAYS

(75) Inventor: Shih Hua Tseng, Taipei (TW)

(73) Assignee: Tatung Co., Ltd., Taipei (TW)

( * ) Notice: Subject to any disclaimer, the term of this patent is extended or adjusted under 35 U.S.C. 154(b) by 693 days.

(21) Appl. No.: 10/872,426

(22) Filed: Jun. 22, 2004

(65) Prior Publication Data

US 2005/0107974 A1 May 19, 2005

(30) Foreign Application Priority Data

Nov. 14, 2003 (TW) ............................. 92131974 A

(51) Int. Cl.
*G06F 11/00* (2006.01)

(52) U.S. Cl. .......................................... 714/46; 702/68

(58) Field of Classification Search ................ 702/117, 702/68; 348/180
See application file for complete search history.

(56) References Cited

U.S. PATENT DOCUMENTS 4,635,096 A * 1/1987 Morgan ...................... 348/181
5,526,043 A 6/1996 Wen ........................... 348/190
6,661,412 B1 * 12/2003 Jun ............................ 345/204
6,809,746 B2 10/2004 Whittington et al. ....... 345/690
7,213,159 B2 * 5/2007 Wu ............................ 713/300
7,213,172 B2 * 5/2007 Iovin et al. ................... 714/36
2003/0056150 A1 3/2003 Dubovsky .................... 714/38
2005/0005220 A1 1/2005 Kang et al. ................. 714/738

OTHER PUBLICATIONS

The VGA-Plus Computer Monitor Tester. (Apr. 9, 2001). Retrieved Aug. 9, 2007, from http://web.archive.org/web/20010409035447/http://www.datasynceng.com/vgapdoc.htm.*

* cited by examiner

*Primary Examiner*—Gabriel L Chu
(74) *Attorney, Agent, or Firm*—Bacon & Thomas, PLLC

(57) ABSTRACT

This invention relates to a method for testing displays. A user interface is used to provide the user with options for different display modes, different power management modes and mode delay times to be selected. Tests of the display frequency and the power management of the displays are made in accordance with the options selected by the user to check on the quality and stability of the displays.

3 Claims, 2 Drawing Sheets

METHOD FOR TESTING DISPLAYS

BACKGROUND OF THE INVENTION

1. Field of the Invention

The present invention relates to a method for testing displays.

2. Description of Related Art

In general, an electronic product is required to have stability or performance tests to check on the quality of the electronic product. A user would like to check on his/her electronic product after purchase to make sure that the electronic product operates properly and stably.

It is a general practice for display tests to go on the tests with a computer means. The computer means provides the user with two interfaces to test the display, one of which refers to a text interface such as disc operating system (DOS) while the other refers to a graphical user interface such as Windows operating system. The text interface has advantages of lower requirement for system resources and quick system power ON/OFF, but the disadvantages of not-user-friendly interface and fewer testing options. The graphical user interface has advantages of user-friendly interface and more testing options, but with a disadvantage of higher requirement for system resources. Currently, most of the users adopt the graphical user interface to go on the display tests.

Even so, the current graphical user interface cannot provide a comprehensive functional test for the displays. For example, the display frequency and the color options built within the Windows operating system have to match with the display frequencies and the colors already provided by the currently available video graphics cards, and cannot be used for the display frequency and the color options which have not yet know of. Hence, the user is unable to test the display with a higher specification to learn of the real performance or limitation of the display under test. In addition, the minimum switching time of the power management mode options built within the Windows operating system is set only one minute, being unable to meet the user's demand for a quickly-switched power management mode.

Therefore, it is desirable to provide an improved display test method to mitigate and/or obviate the aforementioned problems.

SUMMARY OF THE INVENTION

An object of the present invention is to provide a method for testing displays so as to have more options for the display frequency and the power management mode.

It is another object of the present invention to provide a method for testing displays so as to quickly switch the options for the display frequency and the power management mode.

To attain the aforesaid objects, a method for testing displays according to the present invention sets testing parameters required for the display tests by means of a user interface, comprising the steps of: (A) determining whether a direct test proceeds, and if not, proceeding to step (C); (B) selecting a direct test option and proceeding to step (E); (C) determining whether a cyclic test proceeds, and if not, proceeding to step (G); (D) selecting a cyclic test option; (E) setting a mode delay time; (F) testing the display in accordance with the direct test option, or the cyclic test option and the mode delay time; and (G) terminating the user interface; wherein the direct test option or the cyclic test option includes options for at least one power management mode and at least one display mode, the direct test option will go on a test under one of the options for the power management mode or the display mode, and the cyclic test option will go on tests in sequence under options for the at least one power management mode or the at least one display mode.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
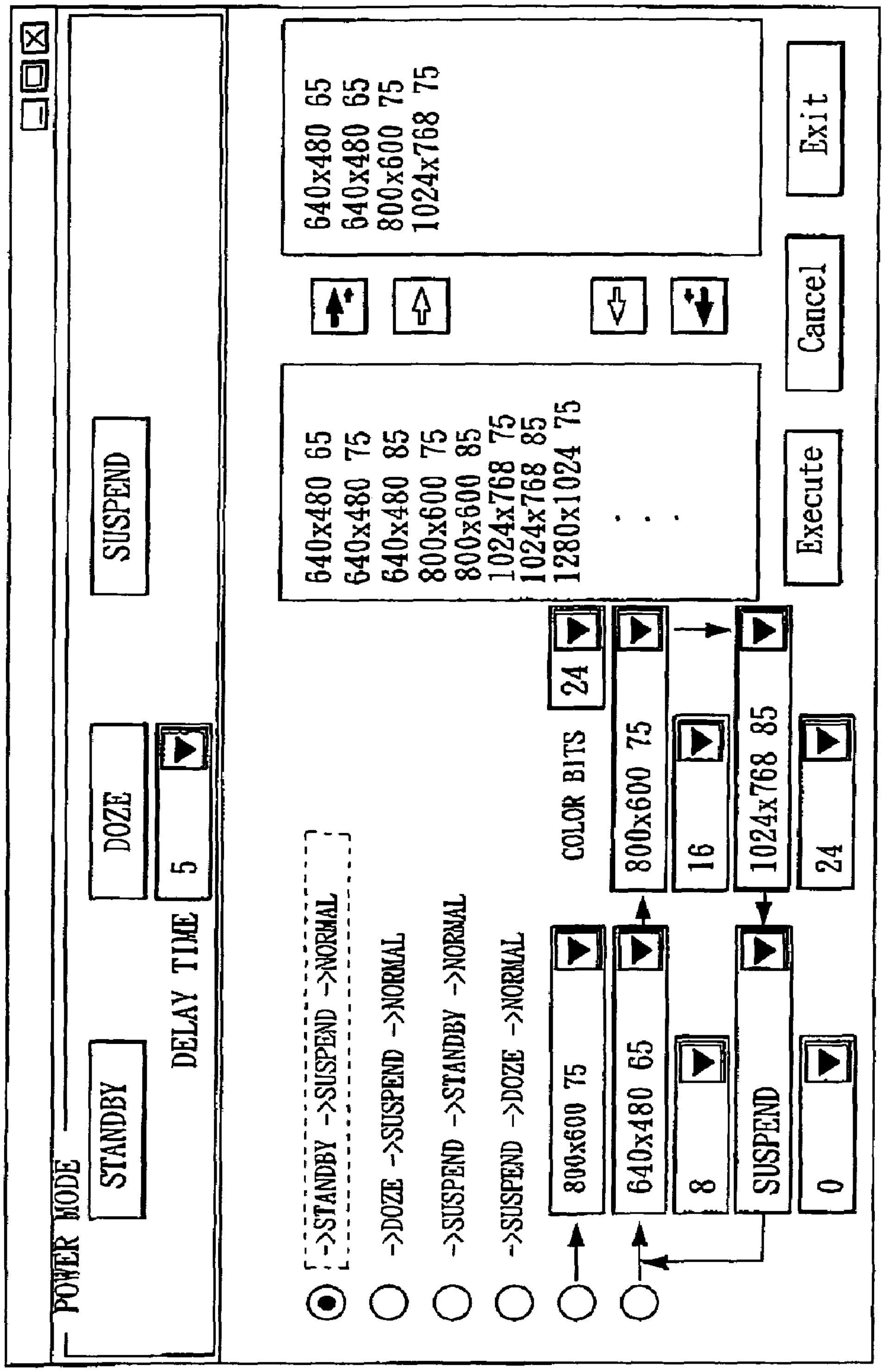
FIG. 1 is a schematic diagram of a user interface in accordance with the present invention.

As shown in FIG. 1, a method for testing displays in accordance with the present invention provides the users with a number of testing options by a graphical user interface. The testing options include power management mode test and display mode test to check on display performance. For the power management mode, at least three power management modes including a standby mode, a doze mode and a suspend mode are provided. These three modes can be set as options for the direct test or the cyclic test to meet the user's demand for the power management mode test. For the display mode, any combinations of resolution, color bit and vertical synchronization frequency options can be used to form parameters of various display modes for going on different display mode tests. Furthermore, the aforesaid display modes can be set as options for the direct test or the cyclic test to meet the user's demand for the display mode test. The direct test means that the user can immediately execute the testing option without setting a sequence of testing options and an interval of delay time between the testing options when the user interface is selected, having advantages of obtaining a testing result immediately following a real-time test for the testing option, but with a disadvantage of only one testing option in each test. The cyclic test means that the user goes on the testing options in sequence in accordance with the order of the testing options and the interval of delay time between the testing options, having an advantage of providing different testing options being tested in sequence to save the user's time for setting the testing options one by one.

Figure 2:
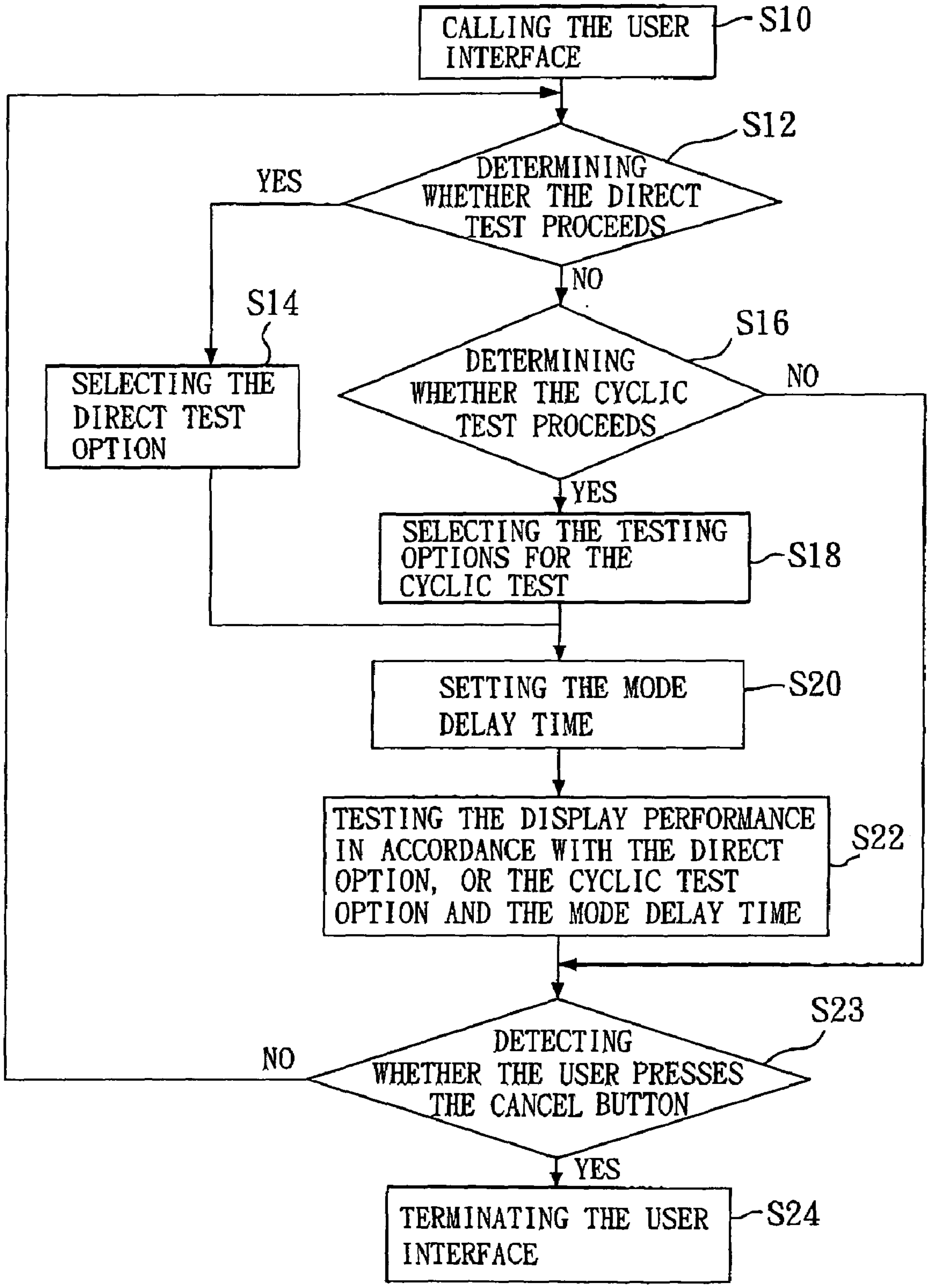
FIG. 2 is a flowchart of a method for testing displays in accordance with the present invention.

As shown in FIG. 2, a method for testing displays according to the present invention comprises the following steps:

Step S10: calling the user interface. The user interface as shown in FIG. 1 provides the user with a number of testing options including the power management mode and the display mode options for the direct test and the cyclic test to check on the display performance.

Step S12: determining whether the direct test proceeds, and if not, proceeding to step S16. When the user wishes to directly test the power management mode or the display mode, the user can select one of the power management modes or the display modes whichever is appropriate to go on the testing option. The options for the direct test are shown in FIG. 1. Parameters required for the display mode include a resolution parameter, a vertical synchronization frequency parameter and a color bit parameter.

Step S14: selecting the direct test option, and proceeding to step S20. If the user selects the direct test option, the user interface records the testing option for the direct test and executes step S20. The testing options for the direct test can be provided for the user's selection by a pull-down menu or a fixed menu.

Step S16: determining whether the cyclic test proceeds, and if not, proceeding to step S24. If the user does not wish to go on the testing options for the direct test or the cyclic test, the user can execute step S24 to terminate the user interface. As a result, the method for testing displays according to the present invention is terminated.

Step S18: selecting the testing options for the cyclic test. If the user selects the testing options for the cyclic test, the user interface records the testing options for the cyclic test, and executes step S20. The testing options for the cyclic test can be provided for the user's selection by a pull-down menu or a fixed menu.

Step S20: setting the mode delay time. After the user selects the testing option for the direct test or the testing options for the cyclic test, the user needs to set the mode delay time so that the testing options for the direct test or the testing options for the cyclic test can be executed in accordance with the time interval set by the user and also the user interface records such mode delay time to execute step S22. The mode delay time is counted by second.

Step S22: testing the display performance in accordance with the direct test option, or the cyclic test option and the mode delay time. If the user selects the "doze" option and sets the mode delay time to be five seconds, the display enters a dozing state for five seconds when the user selects the Execute button. Then, the power management mode of the display resumes to a normal state. If the user wishes to go on the cyclic display mode test, the color bits such as 8 bits (256 colors), 16 bits (65,536 colors) or 24 bits (16M colors), the resolution and operation frequency such as 640×480 and 65 Hz, 800×600 and 75 Hz or 1024×768 and 85 Hz, and the suspend mode of the display are selected at the beginning with a 10-second mode delay time setting. When the user selects the Execute button, the display mode of the display respectively enters display states consisting of 8 color bits with 640×480 at 65 Hz, 16 color bits with 800×600 at 75 Hz, and 24 color bits with 1024×768 at 85 Hz in sequence before entering the suspend mode, each of the modes being executed for 10 seconds in cycle until the user interrupts the program execution (for example, the space bar or the Cancel button on the interface of the Windows operating system is pressed) or all of the above-stated settings are executed once. Then, the display resumes to its normal display state.

Step S23: detecting whether the user presses the Cancel button, and if so, proceeding to step S24 or otherwise proceeding to S12.

Step 24: terminating the user interface. The user can select the Exit button to terminate the user interface.

Although the present invention has been explained in relation to its preferred embodiments, it is to be understood that many other possible modifications and variations can be made without departing from the spirit and scope of the invention as hereinafter claimed.

What is claimed is:

1. A method for testing displays by means of a graphical user interface to set testing parameters required for the display tests, comprising the steps of:

(A) determining whether a direct test proceeds, and if not, proceeding to step (C);

(B) selecting a direct test option and proceeding to step (E);

(C) determining whether a cyclic test proceeds, and if not, proceeding to step (G);

(D)selecting a cyclic test option;

(E)setting a mode delay time;

(F) testing said display in accordance with said direct test option, or said cyclic test option and the mode delay time; and (G) terminating said user interface;

wherein said direct test option or said cyclic test option includes options for at least one power management mode and at least one display mode, said direct test option will go on a test under one of said options for said power management mode or said display mode, and said cyclic test option will go on tests in sequence under options for said at least one power management mode or said at least one display mode.

2. The method of claim 1, wherein said at least one power management mode includes a standby mode, a doze mode and a suspend mode.

3. The method of claim 1, wherein said at least one display mode includes a resolution parameter, a vertical synchronization frequency parameter and a color bit parameter.

* * * * *